United States Patent [19]

Ogawa

[11] Patent Number: 5,079,722
[45] Date of Patent: Jan. 7, 1992

[54] PRINTER CONTROL DEVICE

[75] Inventor: Hiroyuki Ogawa, Kanagawa, Japan

[73] Assignee: Fuji Xerox Co., Ltd., Tokyo, Japan

[21] Appl. No.: 595,353

[22] Filed: Oct. 10, 1990

[51] Int. Cl.$^5$ .............................................. G06K 15/00
[52] U.S. Cl. .................................... 395/111; 346/134
[58] Field of Search ................................. 364/518–520,
364/235 MS File, 900 MS File; 271/227, 157;
400/613, 612, 611, 582; 355/309, 310, 311;
346/154, 134, 136

[56] References Cited

U.S. PATENT DOCUMENTS 4,502,828 3/1985 Stubb ..................................... 271/157
4,885,613 12/1989 Kudoh ................................... 355/310

Primary Examiner—Arthur G. Evans
Attorney, Agent, or Firm—Finnegan, Henderson, Farabow, Garrett, and Dunner

[57] ABSTRACT

In a printer control device, the number of documents to be copied and the number of recording sheets on a sheet supplying tray are detected and subjected to comparison, and when the number of recording sheets is smaller than the number of documents, a signal is generated to replenish the tray with recording sheets, whereby if the number of recording sheets on the tray is not sufficient to copy all the documents, the operator is informed of the shortage of recording sheets before the printing operation starts.

26 Claims, 3 Drawing Sheets

PRINTER CONTROL DEVICE

BACKGROUND OF THE INVENTION

1. Field of the Invention

This invention relates to a printer control device, and more particularly to an improvement of a printer control device.

2. Discussion of the Related Art

Typically, printers have an automatic sheet supplying tray or cassette for supplying recording sheets. The recording sheets are automatically supplied from the automatic sheet supplying tray or cassette to the recording section of the printer, where characters and pictures are printed on them. In this connection, a variety of recording systems are available.

In general, recording sheets are supplied to the sheet supplying tray by an operator who visually detects the number of recording sheets remaining in the tray, and replenishes the tray with recording sheets, when necessary. In one example of a printer, when the number of recording sheets in the tray reaches a predetermined value, a lamp or buzzer is operated to inform the operator that the number of recording sheets remaining in the tray is less than the predetermined value.

The above-described conventional methods of detecting the number of recording sheets in the tray suffers from the following difficulties:

The conventional methods can be used to detect that the number of remaining recording sheets is less than a predetermined value, and transmit a signal that it is necessary to replenish the tray with recording sheets. However, these methods cannot be used to accurately detect how many sheets can be used for printing at that time instant. Accordingly, when a large number of documents are being copied, the printer is sometimes forced to suspend the printing operation when it runs short of recording sheets.

Recently, data processing systems have been extensively employed in which a plurality of data processing units such as computers and workstations are connected to one printer, so that information is printed out according to the file data provided by these data processing units. The file data to be printed out, is transmitted from the data processing units, and stored in the request file storing means in the printer. The file data thus stored is successively transferred to the recording section in the printer, where it is printed out.

As is apparent from the above description, although the quantity of data to be printed at one time is being increased, it is impossible for a printer using the conventional methods to accurately detect the quantity of data stored in the request file storage and the number of recording sheets remaining in the tray or cassette. Therefore, a printer using the conventional methods cannot determine whether the printer will run short of recording sheets.

If the printer runs short of recording sheets, and the printing operation is suspended, then those users utilizing the printer are forced to wait until the printer is replenished with recording sheets. This results in a reduction of the data processing efficiency.

SUMMARY OF THE INVENTION

Accordingly, an object of this invention is to eliminate the above-described difficulties accompanying the conventional method of detecting the number of recording sheets remaining in a printer.

More specifically, an object of the invention is to provide a printer control device which eliminates the difficulty that the printing operation is suspended because the printer runs short of recording sheets.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the printer control device of this invention comprises means for detecting the number of documents to be printed in a printing operation, means for detecting the number of recording sheets contained in recording sheet container, means for comparing the number of documents to be printed and the number of recording sheets before the printing operation starts, and means for generating a signal to replenish the recording sheet container with recording sheets when the number of recording sheets is less than the number of documents to be printed.

Thus, if the number of recording sheets in the recording sheet container is not sufficient to copy all the documents, the operator is informed of the shortage of recording sheets before the printing operation starts.

BRIEF DESCRIPTION OF THE DRAWINGS

The nature, principle and utility of the invention will become more apparent from the following detailed description when read in conjunction with the accompanying drawings.

In the accompanying drawings.

DETAILED DESCRIPTION OF THE PREFERRED EMBODIMENT

Figure 2:
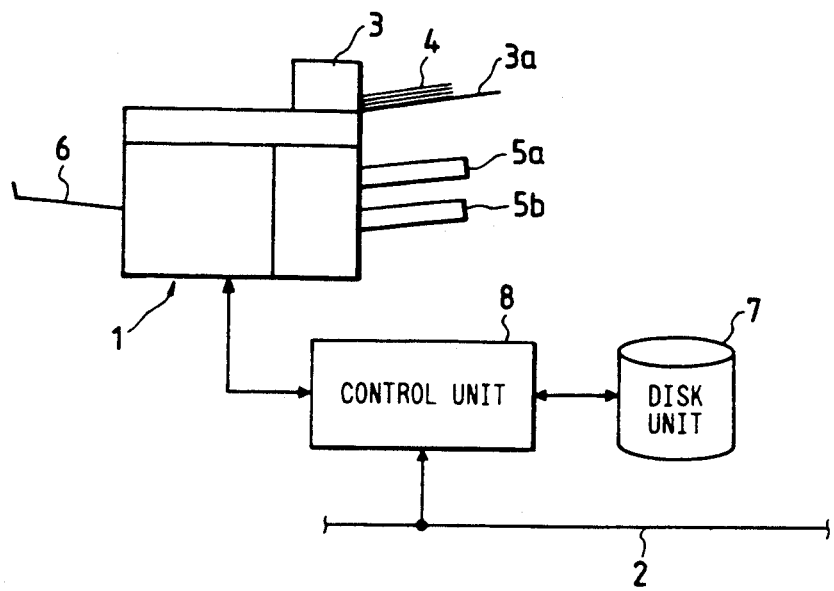
FIGS. 2 and 3 are an explanatory diagram and a block diagram, respectively, for the arrangement of essential elements in a printer device to which the technical concept of the invention is applied.

One embodiment of this invention will now be described with reference to FIG. 2 showing one example of a printer.

As shown in FIG. 2, a printer body 1 operates to print out image data supplied through network 2 from a plurality of data processing units, or the image data of an original 4 to be copied which is read with a reading section in an automatic document feeder 3.

Recording sheets of different size are separately stacked in first and second sheet supplying trays 5a and 5b according to size. One of the sheet supplying trays is selected according to a requested print size, so as to automatically supply the recording sheets into the printer body 1. The recording sheet on which image data has been printed is delivered to a sheet discharging tray 6.

Potentiometers (not shown) are provided for the sheet supplying trays 5a and 5b to measure the heights of the stacks of recording sheets therein. The potentiometers may be either of the linear operation type or of the rotational operation type. That is, a potentiometer may be employed which changes its resistance with the change in position of an actuator which is set in contact with the top of the stack of recording sheets, and outputs an electrical signal, such as a voltage or current signal, representing the change in resistance. The output detection signals of the potentiometers (hereinafter referred to as "sensors", when applicable) is supplied to a detecting section (described later) for detection of the number of recording sheets remaining in the trays.

The same or similar sensor is provided for an automatic original tray 3a to which originals 4 to be copied are supplied by an automatic document feeder 3. The sensor operates to detect the number of originals 4 on the tray 3a.

A printing request received during the printing process of a piece of image data is stored in a disk unit 7.

Figure 3:
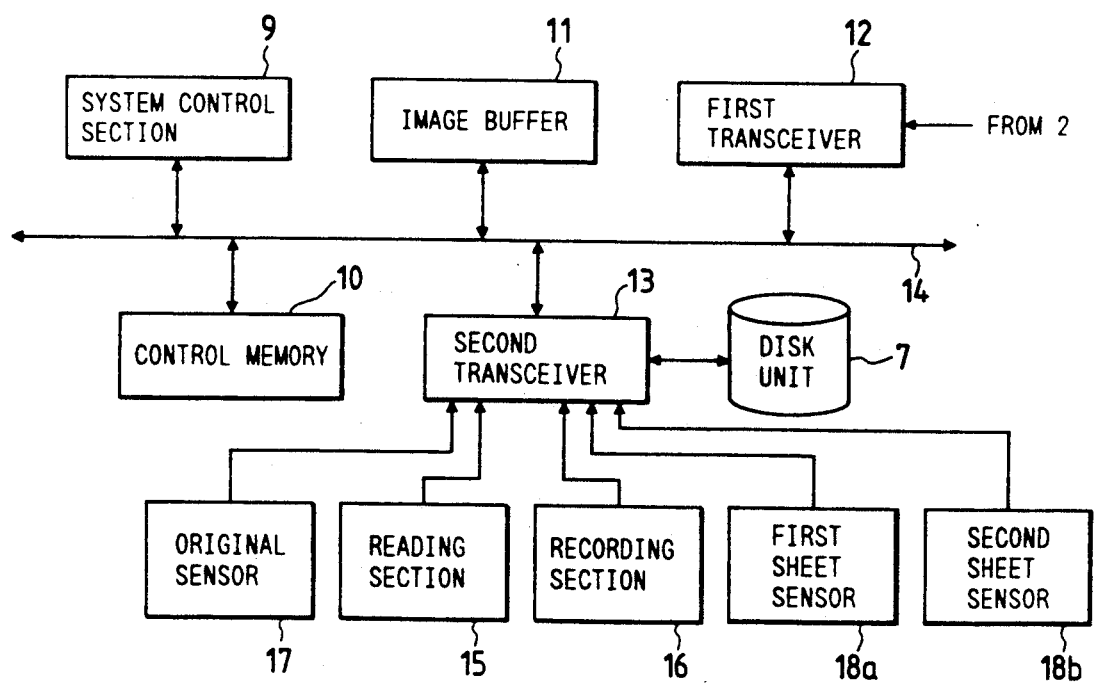

The printer thus organized is controlled by a control unit 8, which is shown in FIG. 3 in more detail.

The control unit 8 has a system bus 14, which is connected to a system control section 9 which includes a CPU, a control memory 10 which includes a ROM and RAM in which data and programs necessary for the operation of the system control section 9 have been stored, an image buffer 11, a first transceiver 12 for controlling the transmission of data to and from the network 2, and a second transceiver 13 for controlling the transmission of data to and from the printer body 1. The image data stored in the disk unit 7 is bit-map-converted into image data suitable for printing, and the image data is stored in the image memory 11, and transferred to a recording section 16 at a predetermined read speed. Image data read by a reading section 15 is transferred to the recording section 16 through the image buffer 11 in response to a print instruction.

The output detection signal of an original sensor 17 provided for the automatic document feeder 3 and the output detection signals of first and second sheet sensors 18a and 18b provided for the automatic sheet supplying trays 5a and 5b are supplied, as status data, to the second transceiver 13.

The functions of essential elements in the embodiment will be described with reference to FIG. 1, in which those elements which have been described with reference to FIG. 3 are therefore designated by the same reference numerals or characters.

Figure 1:
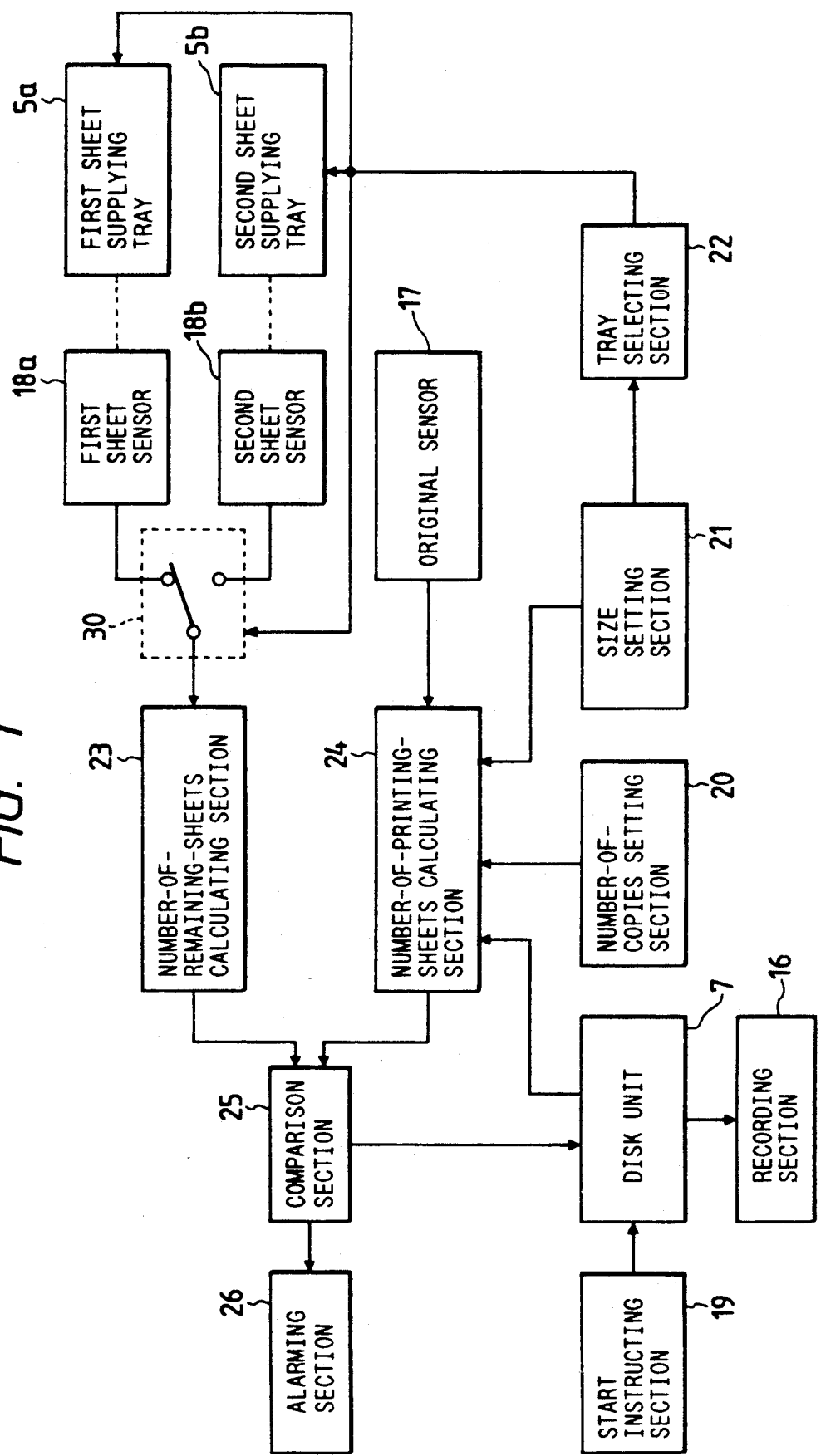
FIG. 1 is a block diagram showing one embodiment of the present invention.

In FIG. 1, in response to an instruction signal issued by the operator or an instruction signal from a data processing unit, a start instructing section 19, a number-of-copies setting section 20, and a size setting section 21 output a printing-start instructing signal, a number-of-copies setting signal, and a print size setting signal, respectively.

In response to the print size setting signal, a tray selecting section 22 selects one of the first and second sheet supplying trays 5a and 5b which contains the recording sheets whose size conforms to the print size setting signal, thus providing a selection signal. The selection signal of the tray selecting section 22 is applied to a switching section 30, so that the output detection signal of one of the first and second sheet sensors 18a and 18b is supplied to a number-of-remaining-sheets calculating section 23. The number-of-remaining-sheets calculating section 23 calculates the number of recording sheets according to the output signal of the first or second sheet sensors 18a and 18b.

A number-of-printing-sheets calculating section 24 calculates the number of printing sheets required for printing out the image data. In an off-line printing process in which, as in a copying operation, originals supplied by the automatic document feeder 3 are copied, the number of originals on the original tray 3a is calculated from the original height detection signal output by the original sensor 17. The number of printing sheets required is then calculated according to the number of originals thus calculated and the aforementioned number-of-copies setting signal. That is, in the number-of-printing-sheets calculating section 24, the number of originals is calculated from the output of the original sensor 17 according to a predetermined calculating expression, and the number of printing sheets required is determined from the product of the number of originals thus calculated and the number of copies.

In an on-line printing process in which image data received through the network 2 and stored in the disk unit 7 is printed out, the number of printing sheets required is determined from the amount of image data supplied from the disk unit 7, the number-of-copies setting signal, and the print size setting signal. That is, the amount of image data stored in the disk unit 7 is applied to the number-of-printing-sheets calculating section 24 in response to the printing-start instructing signal. The number of recording sheets is obtained according to the amount of image data which is required when the image data are subjected page by page, to bit map conversion with the given print size, and the number of printing sheets required is determined from the product of the number of recording sheets thus determined and the number of copies.

The results of calculation of the calculating sections 23 and 24 are applied to a comparison section 25, where they are subjected to comparison.

When the result of calculation of the calculating section 23 is larger than that of the calculating section 24, then it is determined that the number of recording sheets is sufficient, and an instruction signal is provided to output image data. In response to this instruction signal, the disk unit 7 converts the image data stored therein into data suitable for printing, and applies the data to the recording section 16.

When, on the other hand, the result of calculation of the calculating section 23 is smaller than that of the calculating section 24, then it is determined that the number of recording sheets is insufficient, and an instruction signal is outputted to replenish the tray with recording sheets. In response to this instruction signal, an alarming section 26 operates a buzzer or the like to notify the operator.

Figure 5:
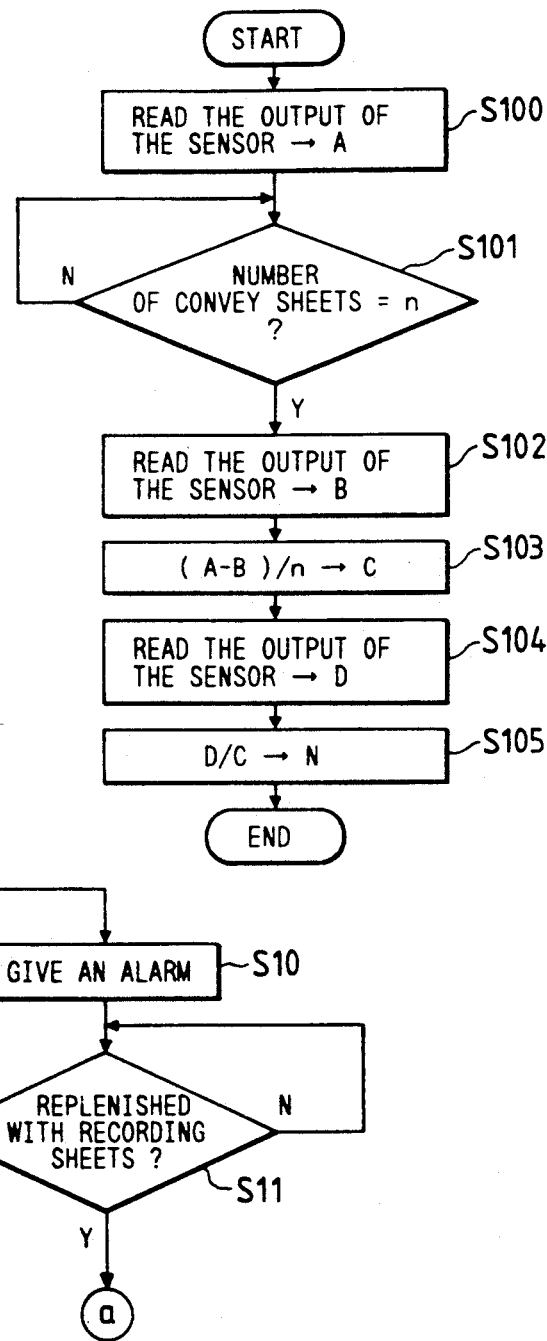
FIG. 5 is a flow chart for a number-of-sheets detecting process.

A procedure for obtaining the number of recording sheets in a supply tray with high accuracy, without the use of a conversion table for converting the height of a stack of recording sheets into the number of recording sheets, will now be described with reference to a flow chart of FIG. 5.

In Step S100, the output of the sensor (potentiometer) for detecting the height of a stack of originals or recording sheets is read. The output thus read is denoted by A.

After a printing operation is started, in Step S101, it is determined whether or not a predetermined number (n) of recording sheets have been conveyed. It is preferable that the predetermined number (n) is five or six.

When it is determined that the predetermined number of recording sheets have been conveyed, Step S102 is effected. In Step S102, the output of the sensor is read again. The output thus read is denoted by B.

In Step S103, the difference between the values A and B is divided by the predetermined number (n). The result of division is denoted by C. That is, the value C is the sensor output per recording sheet.

In Step S104, the output of the sensor is read, and it is denoted by D.

In Step S105, the value D is divided by the value C to obtain the number (N) of originals or recording sheets at that time instant.

As is apparent from the above description, the number of remaining sheets can be detected from the conveyance of the predetermined number of sheets. Thus, the number of remaining sheets can be detected with high accuracy, and it is unnecessary to use a conversion table for converting an output of the sensor into the number of sheets.

Recording sheets are conveyed when a printing operation has been started. Therefore, until the predetermined number of recording sheets have been conveyed, it is impossible to detect the number of recording sheets before printing.

Hence, detection of the number of recording sheets according to the above-described procedure is not carried out at the first printing process; that is, it is conducted beginning with the printing process which occurs after the use of the predetermined number (n) of recording sheets. Until then, it is not determined whether or not the number of recording sheets is large enough. However, in practice, the omission of the determination will cause no trouble because a large number of recording sheets should be stacked on the tray before the first printing process starts.

Figure 4:
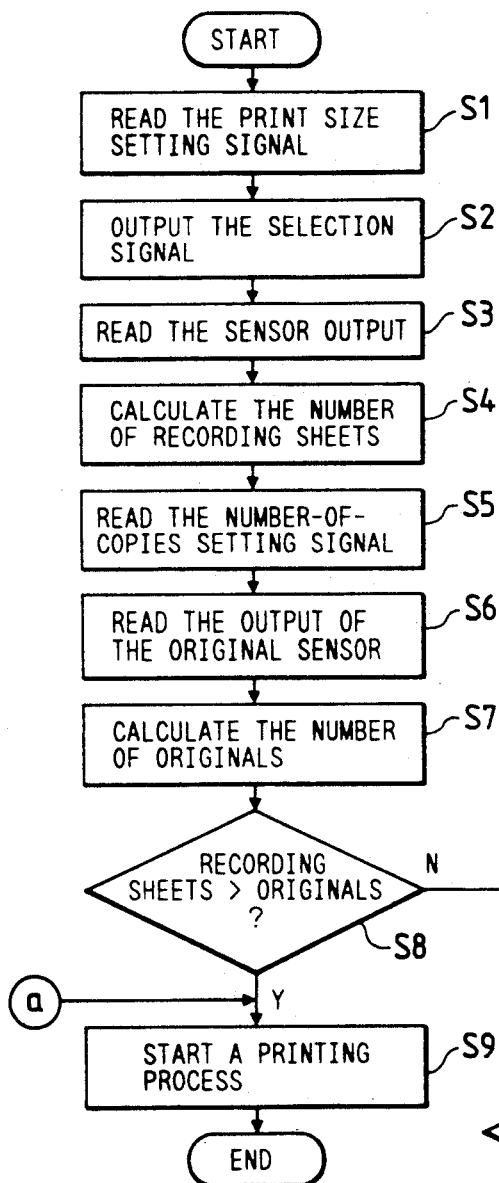
FIG. 4 is a flow chart for the operation of the present invention.

The operation of the embodiment will be described with reference to FIG. 4 which shows an off-line process flow chart.

In Step S1, the print size setting signal is read.

In step S2, in response to the print size setting signal, the selection signal is output to select either the first sheet supplying tray 5a or second sheet supplying tray 5b, and the first sheet sensor 18a or second sheet sensor 18b.

In Step S3, the output of the selected one of the first and second sheet sensors 18a and 18b is read.

In Step S4, the number of recording sheets is calculated in response to the output of the selected sensor.

In Step S5, the number-of-copies setting signal is read.

In Step S6, the output of the original sensor 17 is read.

In Step S7, the number of originals is calculated.

In Step S8, it is determined from the number of recording sheets thus calculated and the number of originals thus calculated whether or not the number of recording sheets is sufficient.

When it is determined that the number of recording sheets is sufficient, Step S9 is effected, so that a printing process is started.

When, on the other hand, it is determined that the number of recording sheets is not enough, Step S10 is effected. In Step S10, an alarming means such as a buzzer is operated to give an alarm so that the tray be replenished with recording sheets.

In Step S11, it is detected whether or not the tray has been replenished with recording sheets. The detection is made as follows: When the tray has been replenished with recording sheet, the operator inputs a restart instruction signal, or the sheet sensor or other upper limit detecting sensor provides an detection signal when the number of recording sheets exceeds a predetermined upper limit value.

When it is determined that the tray is replenished with recording sheets, Step S9 is effected to start a printing process.

Steps S3 and S4 may be replaced with the operation described with reference to FIG. 5.

The operation is such that, in an off-line process in which the image data of originals stacked on the original tray 3a are read and printed out, the number of originals is obtained from the height of the stack of originals.

On the other hand, in the case where the number of originals cannot be directly detected with the sensor as in an on-line process, the number of sheets of documents to be printed is obtained from the amount of data stored in the disk unit 7 as was described above. That is, in this case, of the data stored in the disk unit 7, the number of pages of data to be printed out should be detected instead of Step S6 in FIG. 4.

As was described above, in the embodiment, the number of recording sheets required for printing and the current number of recording sheets remaining on the sheet supplying tray are detected, and the numbers are subjected to comparison to determine whether or not the number of recording sheets remaining on the tray is sufficient. Depending on the result of comparison, an alarm is given to replenish the tray with recording sheets. In the above-described embodiment, the recording sheets are in a fixed form; i.e., cut recording sheets. However, the technical concept of the invention may be equally applied to the case where a recording sheet in the form of a roll is employed. In this case, the outside diameter of the roll is detected with the sensor, and the result of detection is converted into the number of sheets.

As was described above, with the printer control device of the invention, the number of documents to be copied and the number of recording sheets remaining on the tray are compared with each other, to determine whether or not it is necessary to replenish the tray with recording sheets. When it is determined that the tray should be replenished with recording sheets, an alarm is given to replenish the tray with recording sheets before the printing starts.

Hence, the provision of the printer control device of the present invention eliminates the difficulty that, while a large number of documents are being copied, the operation of the printer is suspended when it runs short of recording sheets. That is, with the printer control device of the invention, a large number of documents can be handled continuously with high efficiency.

The foregoing description of preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A printer control device, comprising:
   means for detecting the number of documents to be printed in a printing operation;
   means for detecting the number of recording sheets contained in a recording sheet container;
   means for comparing said number of documents and number of recording sheets before said printing operation starts; and
   means for generating a signal to replenish said recording sheet container with recording sheets when said number of recording sheets is less than said number of documents to be printed.

2. A printer control device as claimed in claim 1, wherein said documents to be printed are stored as data in a disk unit.

3. A printer control device as claimed in claim 2, wherein said documents stored in said disk unit are received from a network.

4. A printer control device as claimed in claim 2, wherein said number of documents to be printed is obtained from the amount of data stored in said disk unit.

5. A printer control device as claimed in claim 1, wherein said documents to be printed are originals read by reading means in a printer.

6. A printer control device as claimed in claim 5, wherein said number of documents to be printed is equal to the product of the number of originals and the number of copies to be printed.

7. A printer control device as claimed in claim 6, wherein said number of originals is calculated using the height of said originals stacked on an original tray.

8. A printer control device as claimed in claim 7, wherein the height of said originals is measured with a potentiometer.

9. A printer control device as claimed in claim 7, wherein said number of originals is further calculated using the unitary thickness of said originals which is calculated from the difference between the heights of said originals stacked on said original tray before and after a predetermined number of originals are conveyed from said tray.

10. A printer control device as claimed in claim 1, wherein said number of recording sheets is calculated using the height of recording sheets stacked on a recording sheet supply tray.

11. A printer control device as claimed in claim 10, wherein the height of said recording sheets is measured with a potentiometer.

12. A printer control device as claimed in claim 10, wherein said number of documents is further calculated using the unitary thickness of said recording sheets which is calculated from the difference between the heights of said recording sheets stacked on said recording sheet supply tray before and after a predetermined number of recording sheets are conveyed from said tray.

13. A printer control device as claimed in claim 1, wherein said recording sheets are stored as a roll, and said number of recording sheets is calculated from the outside diameter of said roll.

14. A printer control device, comprising:
   means for detecting the number of documents to be printed in a printing operation;
   means for selecting one of a first recording sheet container and a second recording sheet container based on desired recording sheet characteristics;
   means for detecting the number of recording sheets contained in the selected recording sheet supply tray;
   means for comparing said number of documents and number of recording sheets before said printing operation starts; and
   means for generating a signal to replenish said selected recording sheet supply tray with recording sheets when said number of recording sheets is less than said number of documents to be printed.

15. A printer control device as claimed in claim 14, wherein said documents to be printed are stored as data in a disk unit.

16. A printer control device as claimed in claim 15, wherein said documents stored in said disk unit are received from a network.

17. A printer control device as claimed in claim 15, wherein said number of documents is obtained from the amount of data stored in said disk unit.

18. A printer control device as claimed in claim 14, wherein said documents to be printed are originals read by reading means in a printer.

19. A printer control device as claimed in claim 18, wherein said number of documents to be printed is equal to the product of the number of originals and the number of copies to be printed.

20. A printer control device as claimed in claim 19, wherein said number of originals is calculated using the height of said originals stacked on an original tray.

21. A printer control device as claimed in claim 20, wherein the height of said originals is measured with a potentiometer.

22. A printer control device as claimed in claim 20, wherein said number of originals is further calculated using the unitary thickness of said originals which is calculated from the difference between the heights of said originals stacked on said original tray before and after a predetermined number of originals are conveyed from said tray.

23. A printer control device as claimed in claim 14, wherein said number of recording sheets is calculated using the height of recording sheets stacked on said selected recording sheet supply tray.

24. A printer control device as claimed in claim 23, wherein the height of said recording sheets is measured with a potentiometer.

25. A printer control device as claimed in claim 23, wherein said number of documents is further calculated using the unitary thickness of said recording sheets which is calculated from the difference between the heights of said recording sheets stacked on said selected recording sheet supply tray before and after a predetermined number of recording sheets are conveyed from said tray.

26. A printer control device, comprising:
   means for detecting the number of documents to be printed in a printing operation;
   means for selecting one of a plurality of recording sheet supply trays based on desired recording sheet characteristics;
   means for detecting the number of recording sheets contained in the selected recording sheet supply tray;
   means for comparing said number of documents and number of recording sheets before said printing operation starts; and
   means for generating a signal to replenish said selected recording sheet supply tray with recording sheets when said number of recording sheets is less than said number of documents to be printed.

* * * * *